July 31, 1951 — H. H. CURRY — 2,562,176
ELECTRICAL SELECTIVE CONTROL APPARATUS
Filed Sept. 25, 1945 — 3 Sheets-Sheet 1
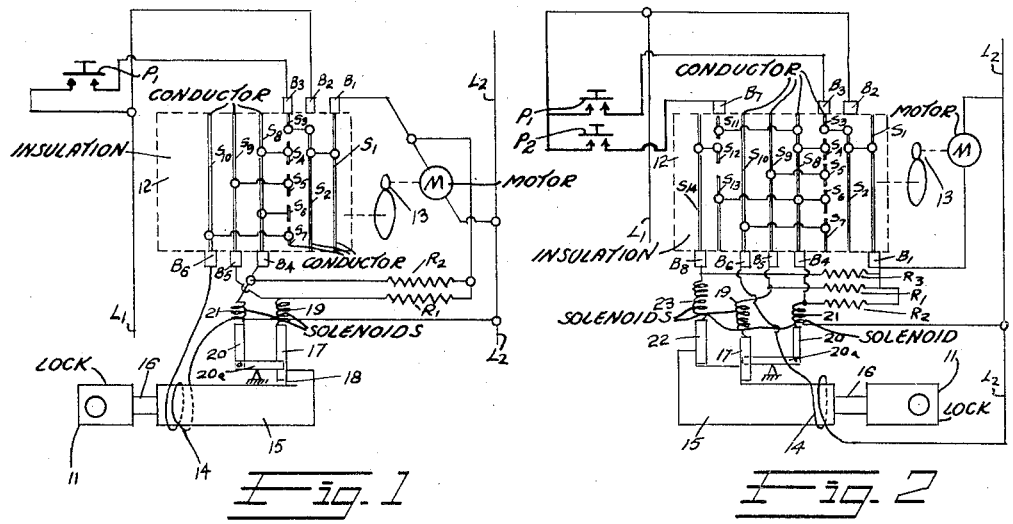
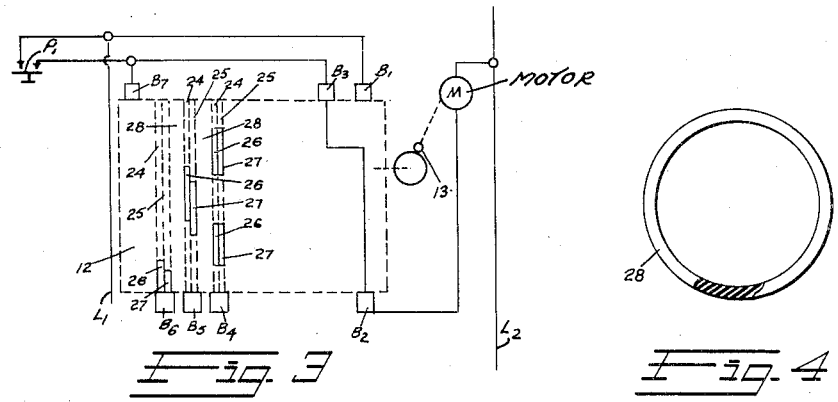
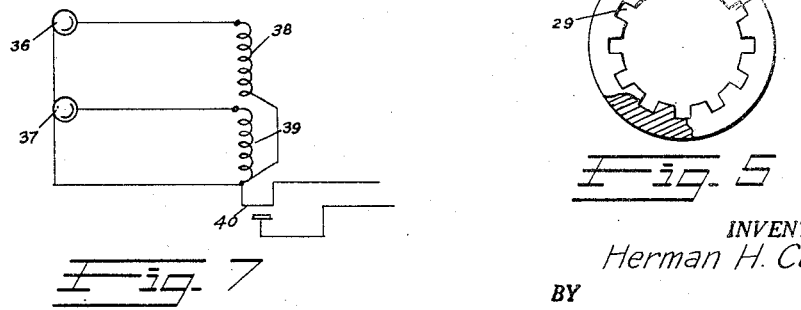
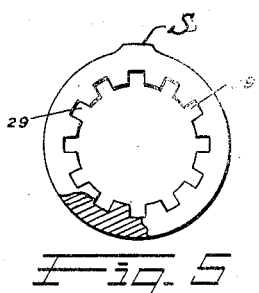
INVENTOR.
Herman H. Curry
BY
Ralph L Chappell
ATTORNEY July 31, 1951   H. H. CURRY   2,562,176
ELECTRICAL SELECTIVE CONTROL APPARATUS
Filed Sept. 25, 1945   3 Sheets-Sheet 3

INVENTOR.
Herman H. Curry
BY
Ralph L. Chappell
ATTORNEY

Patented July 31, 1951

2,562,176

UNITED STATES PATENT OFFICE 2,562,176

ELECTRICAL SELECTIVE CONTROL APPARATUS

Herman H. Curry, United States Coast Guard

Application September 25, 1945, Serial No. 618,601

23 Claims. (Cl. 177—353)

(Granted under the act of March 3, 1883, as amended April 30, 1928; 370 O. G. 757)

This invention relates in general to a remote-control system, and more particularly to apparatus and novel combinations of apparatus for adding to the security of such a system.

Among the many applications of this invention are, for example, the releasing of a lock from a distant point, the opening of a garage door from a car, and the controlling from a shore station of a radio beacon on a navigational buoy anchored at sea. Such operations are performed, in accordance with this invention, in response only to a sequence of a signal pulses of prearranged length and spacing initiated by electric, light, radio, or other desired means. The probability of unauthorized operation of the system, or in the case of radio control, the chance of operation by static or by random signals, is thereby greatly reduced and the security of the system is increased immeasurably.

An object of this invention is to provide simple and reliable control apparatus responsive only to a prearranged combination of signal pulses.

Another object is to provide means for automatically re-setting the control apparatus after operation.

Another object is to provide control apparatus of the type described, responsive only to a prearranged combination of signal pulses in two or more control circuits.

Another object is to provide means whereby an improper step in the operation of the apparauts prevents further operation and automatically re-sets the apparatus.

Another object is to provide means for readily altering the apparatus so as to enable the sequence of signals to which the apparatus is responsive to be changed from time to time.

Another object is to provide a radio-controlled selective distant-control system responsive only to a particular carrier frequency modulated by one or more particular modulation frequencies in a particular coded sequence.

A further object is to provide a light-controlled selective distant-control system responsive only to a prearranged sequence of flashes from an operating light and insensitive to changes in the intensity of ambient light.

A still further object is to provide a combination of control apparatus and locking means responsive thereto.

Further objects and advantages of this invention, as well as its construction, arrangement and operation, will be apparent from the following description and claims in connection with the accompanying drawings, in which Fig. 1 is a diagrammatical illustration showing one embodiment of the control apparatus of this invention;

Fig. 2 is a diagrammatical illustration showing a modification of the control apparatus;

Fig. 3 is a diagrammatical illustration showing means for altering the control apparatus so that it is responsive to signal pulses of shorter or longer duration;

Fig. 4 is a plan view of an insulating ring used in the control apparatus;

Fig. 5 is a plan view of a contact ring of the control apparatus;

Fig. 7 is a diagrammatical illustration of a light sensitive system for initiating signal pulses for operating the control apparatus;

Figure 6:
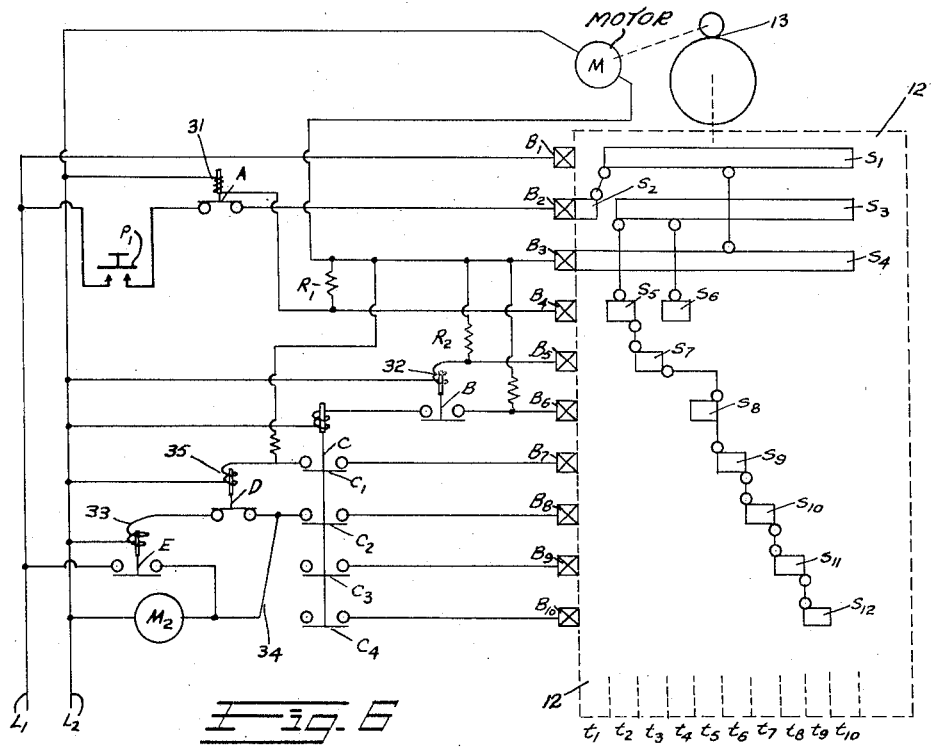
Fig. 6 is a diagrammatical illustration of a further modification of the control apparatus.

Fig. 1 shows a form of my control apparatus in combination with a lock 11, which may be located, for example, upon a garage door (not shown). The garage door is provided with a spring or other opening means (not shown) which will open the door upon release of the lock 11. A push button $P_1$ is located so as to be conveniently operable from a car, or in response to blinking lights, as will be described below.

The control apparatus comprises a motor M, such as a 60 cycle synchronous clock motor, geared to a drum 12, formed of suitable insulation material, by reduction gears as at 13, such that the drum 12 will complete one revolution in a time interval of, for example, 5 seconds. On the drum 12 are conducting segments $S_1$, $S_2$, $S_3$, $S_4$, $S_5$, $S_6$, $S_7$, $S_8$, $S_9$, and $S_{10}$, insulated from each other and from ground except as shown. Brushes $B_1$, $B_2$, $B_3$, $B_4$, $B_5$ and $B_6$ make contact with certain of the segments during the revolution of the drum 12 as shown and as described below.

A solenoid 14, connected to brush $B_6$, operates, when energized, upon a plunger 15 to force back a bolt 16 of the lock 11, which may be a key operated cylinder lock of any conventional type. A tumbler 17 normally engaging a stop 18 on the plunger 15 locks the plunger 15 against movement in response to the solenoid 14 unless tumbler 17 is raised and disengaged from the stop 18 by a solenoid 19. Another tumbler 20 in response to a solenoid 21 actuates a lever arm 20a which then engages the stop 18 thereby also securing the plunger 15 against movement. Solenoids 19 and 21 are connected to brushes $B_5$ and $B_4$, respectively, and when energized through these brushes raise the corresponding tumblers 17 and 20. The solenoids 19 and 21 are weakly energized through resistances $R_1$ and $R_2$ whenever the motor M is in operation by a force sufficient to hold the tumblers 17 and 20 once they have been picked up by an energizing force through brushes $B_4$ and $B_5$.

A momentary closing of push-button contact $P_1$, for say one-half second, completes a circuit from input $L_1$ through brush $B_3$, segment $S_3$, segment $S_2$, segment $S_1$, brush $B_1$, through motor M to output $L_2$, thereby starting the motor M. After a small movement of the drum 12 the motor circuit is transferred through brush $B_2$, segment $S_2$, segment $S_1$, and the motor M, and the push button circuit $P_1$ is transferred to the segment $S_4$. The segment $S_2$ is of such length that the motor M will continue to operate until the drum 12 completes one revolution and stops in the original position. If the contact $P_1$ is closed while either segments $S_4$ or $S_6$ are passing under the brush $B_3$, solenoid 21 will be energized and the tumbler 20 will be picked up thereby causing the lever arm 20a to lock the plunger 15 against operation. If contact $P_1$ is closed during the time that segment $S_5$ is passing brush $B_3$, solenoid 19 is energized and tumbler 17 is picked up, so that if the lever arm 20a is not in locking position the plunger 15 may be operated to release the lock 11. This is accomplished by closing contact $P_1$ while segment $S_7$ is in contact with brush $B_3$ so as to energize solenoid 14. Whether or not the sequence in the time of closing contact $P_1$ has been such as to release the lock 11 the drum 12 will complete one revolution and stop in its original position.

Fig. 2 shows a modification having an additional contact switch $P_2$, additional brushes $B_7$ and $B_8$ and additional contact segments $S_{11}$, $S_{12}$, $S_{13}$ and $S_{14}$. An additional locking tumbler 22 holds plunger 15 in locked position unless raised by solenoid 23 which is energized by a circuit from $L_1$ through switch contact $P_2$, brush $B_7$, contact segment $S_{12}$, contact segment $S_{14}$ and brush $B_8$. The solenoid 23 is weakly energized through resistance $R_3$ so that tumbler 22 once raised is held in raised position during further revolutions of the drum 12. The additional segments $S_{11}$ and $S_{13}$ are arranged so that if $P_2$ is closed while either $S_{11}$ or $S_{13}$ is passing brush $B_7$, the locking solenoid 21 is energized to cause the lever arm 20a to lock the plunger 15 against movement during one revolution of the drum 12.

Fig. 3 shows means by which the duration of contact time between brush and segment can be made adjustable. Two or more contact rings as 24 and 25 are arranged so as to have overlapping contact segments 26 and 27. By varying the amount by which the contact segments 26 and 27 overlap, the duration of time of contact can be varied. Insulating rings 28, as in Fig. 4, are used to separate all contact rings except those that are to overlap. The brushes are also prevented by the insulating rings 28 from making contact except with the contact segments of the contact rings.

Fig. 5 shows the construction of the contact rings whereby they can be placed in different positions upon the contact drum 12. The contact rings are provided with regularly spaced notches as at 29 upon their inner surfaces which fit upon corresponding splines (not shown) upon the control drum 12. The outer surface is provided with contact segments S in the form of raised portions, as shown. Thus by removing the contact rings and re-arranging them upon the drum 12 any desired sequence of contact of the segments S with the brushes can be obtained.

Fig. 6 shows diagrammatically a system and apparatus, similar to that shown in Figs. 1 and 2, applied to a distant-control mechanism in place of a lock, whereby one or more control functions can be performed from a distance with small probability of either accidental or unauthorized interference. It is assumed, for example, that one of the functions to be performed is the starting and stopping of a motor $M_2$.

The control drum 12 is provided with contact segments $S_1$ through $S_{12}$, so arranged as to contact certain of brushes $B_1$ through $B_{10}$ at various predetermined time intervals $t_1$ through $t_{10}$, as the drum 12 turns through one revolution. Momentary closing of $P_1$ completes a circuit from $L_1$, through normally closed relay A, brush $B_2$, contact segment $S_2$, contact segment $S_1$, contact segment $S_4$, brush $B_3$, through motor M to $L_2$. The motor M starts and the control drum 12 begins a revolution. A circuit is then closed from $L_1$, through $B_1$, $S_1$, $S_4$, $B_3$ and motor M to $L_2$ until the drum 12 completes one revolution and comes back to its starting position. If $P_1$ is closed during time interval $t_2$ or $t_4$ as the drum 12 is revolving, a circuit will be closed from $L_1$, through $P_1$, closed relay A, $B_2$, $S_3$, through $S_5$ or $S_6$ depending on the time interval, brush $B_4$, and solenoid coil 31 of relay A to $L_2$, thereby causing the relay A to open. The relay A is held open by a weak energizing force through $R_1$ as long as a circuit is complete to the motor M, and thus $P_1$ is inoperative throughout the remaining revolution of the drum 12.

If $P_1$ remains open during the time intervals $t_2$ or $t_4$ but is closed during the time interval $t_3$, relay coil 32 of relay B is energized, relay B closes and is held closed throughout the remainder of the cycle by a weakly energizing force through $R_2$. This makes possible the closing of relay C by closing $P_1$ during time interval $t_5$. Closing relay C completes the "unlocking" cycle by closing contacts $C_1$, $C_2$, $C_3$ and $C_4$ to various control functions. These functions can then be selected by closing $P_1$ at the desired time intervals $t_7$, $t_8$ or $t_9$.

It can be noted that up to this point failure either to close or open contact $P_1$ when indicated will leave relay C open so no interference with control would be possible until after drum 12 has completed a revolution and another sequence initiated.

Assuming that $P_1$ has been closed in the sequence correctly timed so that relay C is closed, if $P_1$ is then closed in the time interval $t_7$, solenoid coil 33 of relay E is energized and relay E is closed (as relay D is normally closed). This causes the motor $M_2$ to start, thereby completing one of the desired control functions. Relay E is held closed in a conventional manner by a holding connection 34 which supplies energy to solenoid coil 33 as long as relay D remains closed. If it is desired to stop the motor $M_2$, the same sequence is repeated with the contact $P_1$ as described to close relay C. Then, $P_1$ is closed during the time interval $t_8$, coil 35 is energized which opens the relay D thereby breaking the circuit to coil 33 which allows relay E to open. The motor $M_2$ stops and all relays and the drum 12 return to original starting position.

Other control functions as desired can be performed from circuits through relay contacts $C_3$ and $C_4$ and contact segments $S_{11}$ and $S_{12}$. Other segments and contacts may be added as necessary. For selective operation of several control functions, a transmitting drum, driven at the same speed or slightly slower than drum 12 by a similar motor started simultaneously with the motor M at the receiving end at the first closing of contact $P_1$, can be used to send operating pulses at desired time intervals.

Fig. 7 shows a light sensitive system to be used in combination with the control apparatus where it is desired to initiate operating pulses in response to headlights, spotlights, flashlight, or other lighting means. This system is of especial value in combination with a control system used, for example, to open a garage door in response to flashes from automobile headlights.

The light sensitive system shown in Fig. 7 comprises two photo-electric cells 36 and 37 connected to differentially wound coils 38 and 39 of a relay 40 which corresponds to the push button contact switches $P_1$ of Figs. 1, 2 and 6. By differentially winding the coils 38 and 39 the relay is made insensitive to changes in ambient light. In order to operate the system the cells are arranged so that only one cell receives flashes from the operating light.

In place of a light sensitive system a radio operated system can be used in combination with the above described control apparatus. Radio operated systems, of particular advantage when used in combination with the control apparatus, in that they add to the security of the combination, are shown in Figs. 8 and 9.

Figure 8:
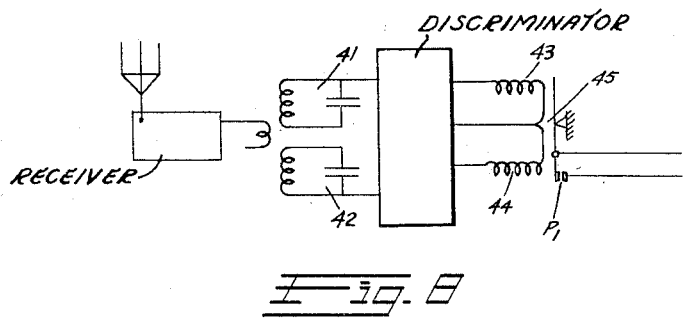
Fig. 8 is a diagrammatical illustration of a radio system for initiating signal pulses for the operation of control apparatus.

Fig. 8 shows a receiving unit having a pair of tuned circuits 41 and 42 after the second detector which control the power supplied to coils 43 and 44 of a differential relay 45. The relay 45 controls the operation of contact $P_1$, which corresponds to contact $P_1$ in Figs. 1 and 6. The tuned circuits 41 and 42 are responsive to frequency modulated transmission signals sent out and modulated by two supersonic or radio frequencies at a transmitting station (not shown). Modulation by one frequency operates the relay 45 to open the contact $P_1$ while modulation by the other frequency operates the relay 45 to close the contact $P_1$. The system shown in Fig. 8 can readily be combined with the control apparatus as shown in Figs. 1 and 6 or with any desired modifications of the control apparatus. Thus a radio controlled, selective, distant-control system is obtained which is responsive only to a particular carrier frequency modulated by one or two particular modulation frequencies in a particular coded sequence, and which coded sequence of modulation pulses is subject to convenient change when desired.

Figure 9:
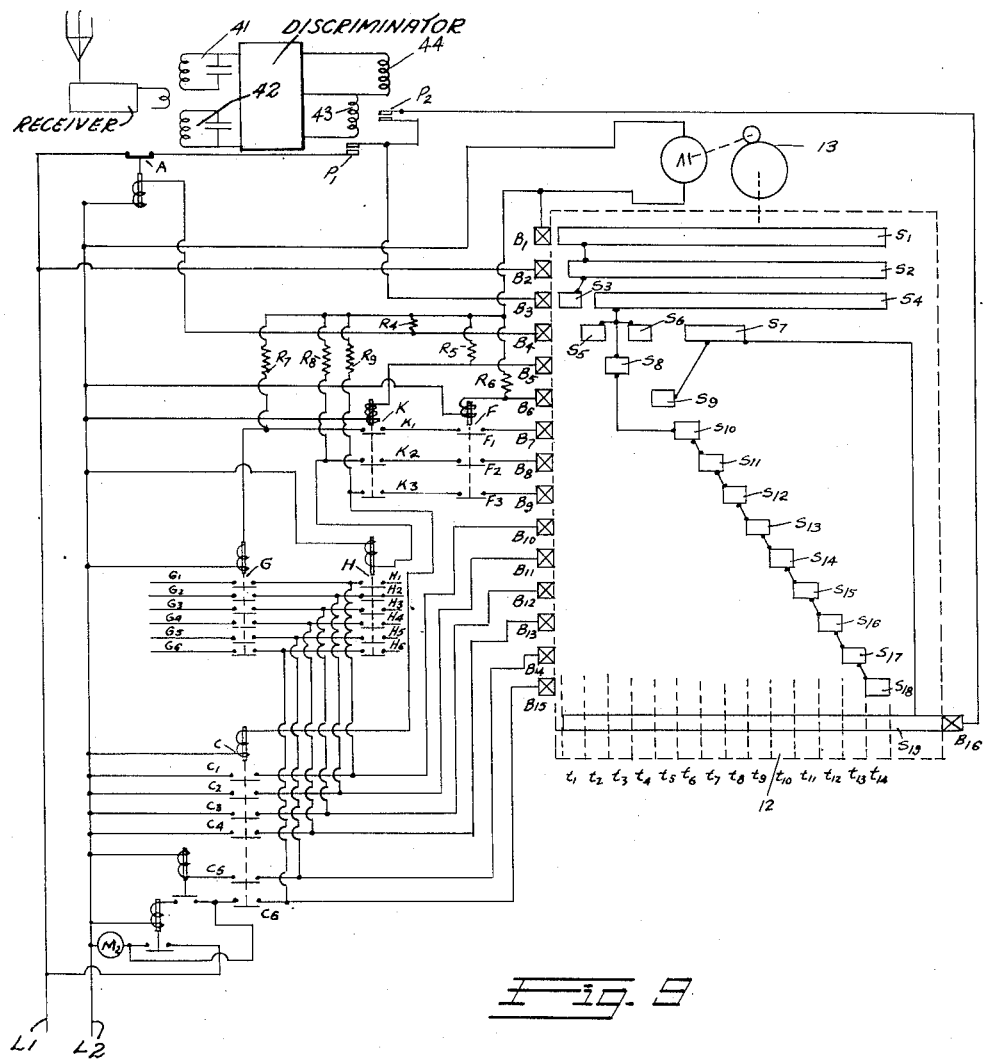
Fig. 9 is a diagrammatical illustration showing a novel combination of a further modification of the control apparatus and a radio system for controlling said apparatus.

Fig. 9 shows a further modification of both radio control system and control apparatus. In this modification one relay coil 43 operates a contact switch $P_1$ in one control circuit in response to signals from tuned circuit 42, while the other relay coil 44 operates a contact switch $P_2$ in a second control circuit in response to signals from the other tuned circuit 41.

The control apparatus of Fig. 9 is arranged so that any group of a plurality of control circuits and any individual control circuit of a selected group can be selected in response to a particular combination of pulses in the two control circuits. As in Fig. 6, a pulse from $P_1$ starts the drum 12 which continues to turn for one revolution. A pulse from $P_1$ in the time intervals $t_2$ or $t_4$ or a pulse from both $P_1$ and $P_2$ in the time intervals $t_6$, $t_7$ or $t_8$ causes relay A to open, thereby preventing further operation of the control circuits until the drum 12 has completed its revolution. If an improper pulse during one of these time intervals has not rendered the system inoperative, a pulse from $P_1$ in the time interval $t_3$ will cause relay K to close contacts $K_1$, $K_2$ and $K_3$, and a pulse from both $P_1$ and $P_2$ during the time interval $t_5$ will cause relay F to close contacts $F_1$, $F_2$, and $F_3$. Any desired group of control circuits can now be selected by closing the proper relay C, G or H. Relay G can be closed by a pulse from $P_1$ during time interval $t_6$, relay H can be closed by a pulse from $P_1$ during time interval $t_7$, or relay C can be closed by a pulse from $P_1$ during time interval $t_8$. Individual circuits of the selected group, as $G_1$, $G_2$, $G_3$, etc., $H_1$, $H_2$, $H_3$, etc., or $C_1$, $C_2$, $C_3$, etc., can now be selected by a proper pulse from $P_1$ during time intervals $t_9$ $t_{10}$, $t_{11}$, $t_{12}$, $t_{13}$ or $t_{14}$. As previously explained the control circuits can be used to perform any desired number of control functions, such as the starting and stopping of the motor $M_2$ as described in connection with Fig. 6.

A preferred sequence for the two-modulation-frequency control system shown in Fig. 9 is that in which either one of the modulation frequencies is in operation during all parts of the cycle and have partly overlapping portions. It will be apparent to those skilled in the art that the contacts of the drum 12 can be so arranged as to require simultaneous closing of push buttons $P_1$ and $P_2$, in a manner similar to the arrangement that would obtain if, in Fig. 2, segments $S_{11}$, $S_{12}$ and $S_{13}$ were reoriented on drum 12 relative to segment $S_5$ so that $S_{12}$ is aligned with $S_5$.

It is to be understood that various modifications and changes can be made in this invention without departing from the spirit and scope thereof.

The invention described herein may be manufactured and used by or for the Government of the United States of America for governmental purposes without the payment of any royalties thereon or therefor.

What is claimed is:

1. A selector system for increasing the security of a control system including a plurality of control circuits comprising means for initiating a series of electrical pulses, control means including a rotatable drum having conductive segments on a surface thereof, said segments being individually adjustable to be affected by a prearranged sequence of said electrical pulses to select and complete any of said control circuits, and means for automatically resetting said control means after operation.

2. The selector system as defined in claim 1, further comprising sliding contact means for connecting said segments to said circuits, predetermined conductive segments being disposed in adjustable side-by-side relation, thereby to provide an adjustable time of contact between said predetermined segments and an associated sliding contact means.

3. The selector system as defined in claim 1, wherein said control circuits include brush means periodically contactable by said segments, and means for adjusting the duration of contact between said brush means and said segments.

4. A selector system for increasing the security of a control system including a plurality of control circuits comprising means for initiating a series of electrical pulses, control means including a rotatable drum having conductive segments on a surface thereof, said segments being individually adjustable to be affected by predetermined sequences of said electrical pulses and operable only after reception of said particular sequences to select and complete any of said control circuits, and further means responsive to an improper electrical pulse in the said sequences to prevent the completion of any of said control circuits until said control means has been reset.

5. A selector system for increasing the security of a control system including a plurality of control circuits comprising means for initiating a series of electrical pulses, control means including a rotatable drum having individually adjustable conductive segments on a surface thereof, and stationary contacting members selectively connectible to said segments to define a circuit actuatable only by particular sequences of said electrical pulses and operable only after reception of said particular sequences to select and complete any of said control circuits, further means responsive to an improper electrical pulse in the said sequences to prevent the completion of any of said control circuits until said control means has been reset, and means for automatically resetting said control means after a predetermined time interval.

6. A selector system for increasing the security of a control system including a plurality of control circuits comprising means for initiating a series of electrical pulses, control means including a rotatable drum having individually adjustable conductive segments on a surface thereof, and stationary contacting members selectively connectible to said segments to define a circuit actuatable only by particular sequences of said electrical pulses of prearranged length and spacing and operable only after reception of said particular sequences to select and complete any of said control circuits, means responsive to an improper electrical pulse in the said sequences to prevent the completion of any of said control circuits until said control means has been reset, and means for automatically resetting said control means after a predetermined time interval.

7. A control system for an electrically operated lock comprising means for initiating a series of electrical pulses, and control means including a rotatable drum having conductive segments on the surface thereof and actuatable by a particular sequence of said electrical pulses to unlock said lock, said control means being responsive to an improper electrical pulse in the sequence to prevent the unlocking of said lock by further electrical pulses until the control means has been reset.

8. A control system for increasing the security of an electrically operated lock comprising a plurality of control circuits, means in each control circuit for initiating a series of electrical pulses, and control means including a rotatable drum having adjustable conductive segments on the surface thereof and actuatable by a particular sequence of said electrical pulses from said control circuits to unlock said lock, said control means being responsive to an improper electrical pulse in the sequence in any one of said control circuits to prevent the unlocking of said lock until the control means has been reset.

9. A selector system for closing any of a plurality of electrical circuits in response to predetermined sequences of light flashes comprising a pair of light sensitive cells, a control circuit, a differential relay in said control circuit responsive to signals from one of said cells to initiate electrical pulses in said control circuit, and control means including a rotatable drum having conductive segments on the surface thereof and actuatable by predetermined sequences of said electrical pulses to select and close any of said electrical circuits.

10. A control system for operating a lock in response to a predetermined sequence of light flashes comprising a pair of light sensitive cells, a control circuit, a differential relay in said control circuit responsive to signals from one of said cells to initiate electrical pulses in said control circuit, control means including a rotatable drum having conductive segments on the surface thereof and actuatable by a particular sequence of said electrical pulses to unlock said lock, said control means being responsive to an improper electrical pulse in the sequence to prevent the unlocking of said lock by further electrical pulses until said control means has been reset, and means for automatically resetting said control means after a predetermined time interval.

11. A radio-controlled selective distant-control system comprising radio receiving means having a pair of tuned circuits adapted to select two differently modulated frequencies, a relay operatively responsive to signals from said tuned circuits, and a control unit including a rotatable drum having conductive segments on the surface thereof and actuatable by prearranged sequences of pulses from said relay to select any of a plurality of control circuits.

12. The system as in claim 11, wherein said relay is a differentially wound device.

13. A radio-controlled selective distant-control system comprising radio receiving means having a pair of tuned circuits adapted substantially simultaneously to select two differently modulated frequencies, a relay operatively responsive to signals from one of said tuned circuits, another relay operatively responsive to signals from the other of said tuned circuits, and a control unit responsive to predetermined sequences of pulses from said relays to select any of a plurality of control circuits.

14. A radio-controlled selective distant-control system for selecting any one of a plurality of groups of control circuits and any of the individual control circuits in a selected group in response to a coded sequence of radio signals comprising radio receiving means having a pair of tuned circuits adapted to select two differently modulated frequencies, a relay operatively responsive to signals from one of said tuned circuits, another relay operatively responsive to signals from the other of said tuned circuits, and a control unit responsive to certain pulses in a predetermined time sequence of pulses from said relays to select one of said groups of control circuits and responsive to further pulses in said predetermined time sequence to select individual circuits in the selected group.

15. A radio-controlled selective distant-control system for selecting any of a plurality of control circuits comprising radio receiving means having a pair of tuned circuits adapted to select two differently modulated frequencies, relay means responsive to signals from said tuned circuits to control a series of electrical pulses, control means responsive only to particular sequences of said electrical pulses of prearranged length and spacing to select and complete any of said control circuits, and means for altering said control means to render it responsive only to other sequences of electrical pulses of different length and spacing, whereby the control system is responsive only to a particular carrier frequency modulated by one or more particular modulation frequencies in a particular coded sequence which may be changed from time to time.

16. In combination, an object to be controlled, means for controlling said object, a rotatable drum having conductive segments thereon, motive means for said drum, circuit means connectible with said segments and including switch means, said circuit means being operable on momentary actuation of said switch means to rotate said drum through one cycle only, said switch means being operable subsequent to said momentary actuation and during said one cycle to provide a signal of predetermined character, means connecting said segments and defining therewith means responsive to said signal for actuating said object-controlling means to control said object.

17. The combination as in claim 16 wherein said conductive segments are adjustably mounted on said cylinder.

18. The combination as in claim 16 wherein said conductive segments are adjustably mounted on said cylinder, said combination further comprising means interconnecting said segments in predetermined spatial arrangement.

19. The combination as in claim 16, wherein said object-controlling means are normally maintained in blocked condition.

20. The combination as in claim 16, further comprising latch means normally maintaining said object-controlling means in locked condition, said last-named means being responsive to said signal to release said latch means.

21. Remote-control apparatus comprising radiant-energy responsive means for simultaneously selecting a pair of differently modulated frequencies, a plurality of control circuits, first means responsive to signals of a first frequency value derived from said selecting means for providing an output corresponding thereto, second means responsive to signals of a second frequency value derived from said selecting means for providing an output corresponding thereto, and a control unit responsive to predetermined sequences of signals from the outputs of said first and second means to select a predetermined control circuit.

22. The apparatus as in claim 21 wherein said control unit comprises a rotatable drum having conductive segments thereon for providing circuit means respectively between said first and second means and said control circuits.

23. The apparatus as in claim 22 wherein said segments are adjustable for accommodating different sequences of signals.

HERMAN H. CURRY.

REFERENCES CITED

The following references are of record in the file of this patent:

UNITED STATES PATENTS

| Number | Name | Date |
|---|---|---|
| 1,205,460 | Lyons | Nov. 21, 1916 |
| 1,791,597 | Vernam | Feb. 10, 1931 |
| 1,888,904 | Brauer | Nov. 22, 1932 |
| 2,069,860 | Stewart | Feb. 9, 1937 |
| 2,095,688 | Ballentine | Oct. 12, 1937 |
| 2,141,551 | Phinney | Dec. 27, 1938 |
| 2,235,804 | Macalpine | Mar. 18, 1941 |
| 2,262,766 | Jansson | Nov. 18, 1941 |
| 2,295,025 | Bowsher | Sept. 8, 1942 |
| 2,325,829 | Boswau | Aug. 3, 1943 |
| 2,406,834 | Hartley et al. | Sept. 3, 1946 |
| 2,434,898 | Boscom | Jan. 27, 1948 |